US007672985B2

(12) United States Patent
Bookman et al.

(10) Patent No.: US 7,672,985 B2
(45) Date of Patent: Mar. 2, 2010

(54) AUTOMATED CREATION AND DELIVERY OF DATABASE CONTENT

(75) Inventors: Marc Bookman, Palo Alto, CA (US); David Kurtz, Redwood City, CA (US); Niket Patwardhan, San Jose, CA (US)

(73) Assignee: Sentius International Corporation, McLean, VA (US)

( * ) Notice: Subject to any disclaimer, the term of this patent is extended or adjusted under 35 U.S.C. 154(b) by 450 days.

(21) Appl. No.: 11/554,241

(22) Filed: Oct. 30, 2006

(65) Prior Publication Data
US 2008/0133591 A1 Jun. 5, 2008

Related U.S. Application Data

(63) Continuation of application No. 10/218,738, filed on Aug. 15, 2002, now Pat. No. 7,130,861.

(60) Provisional application No. 60/313,041, filed on Aug. 16, 2001.

(51) Int. Cl.
*G06F 17/30* (2006.01)
(52) U.S. Cl. .............................. 707/755; 704/9; 704/10
(58) Field of Classification Search ..................... 704/9, 704/10; 715/709; 707/3, 6, 10, 102, 104.1
See application file for complete search history.

(56) References Cited

U.S. PATENT DOCUMENTS

| | | | |
|---|---|---|---|
| 3,872,448 A | 3/1975 | Mitchell Jr. et al. | |
| 4,136,395 A | 1/1979 | Kolpeck et al. | |
| 4,318,184 A | 3/1982 | Millett et al. | |
| 4,384,288 A | 5/1983 | Walton | |
| 4,651,300 A | 3/1987 | Suzuki et al. | |
| 4,674,065 A | 6/1987 | Lange et al. | |
| 4,689,768 A | 8/1987 | Heard et al. | |

(Continued)

FOREIGN PATENT DOCUMENTS

EP      0 093 250      11/1983

(Continued)

OTHER PUBLICATIONS

Allen, "Introduction to Natural Language Understanding", Natural Language Understanding, Chapter 1, p. 1-19, The Benjamin/Cummings Publishing Company, Inc., 1988.

(Continued)

*Primary Examiner*—Leslie Wong
(74) *Attorney, Agent, or Firm*—Hunton & Williams, LLP

(57) ABSTRACT

A method and apparatus are disclosed which automatically build a database by automatically identifying a term of interest and building a term database with supplemental content from an assigned source for that term. A term can be selected by applying various rules. An advertiser can sponsor the term, for example, by having an advertisement window automatically pop-up on a keyword search. Content windows can be attached to the term, the content window containing information such as definitions, related products or services, sponsorship information, information from content syndicators, translations and reference works. Data objects that represent the contents of the database and templates are syndicated to remote servers running a processing engine. The processing engine uses these data objects to execute linking rules without requiring a connection to the database.

46 Claims, 7 Drawing Sheets

U.S. PATENT DOCUMENTS

| | | |
|---|---|---|
| 4,742,481 A | 5/1988 | Yoshimura |
| 4,773,009 A | 9/1988 | Kucera et al. |
| 4,817,050 A | 3/1989 | Komatsu et al. |
| 4,837,797 A | 6/1989 | Freeny, Jr. |
| 4,864,501 A | 9/1989 | Kucera et al. |
| 4,868,743 A | 9/1989 | Nishio |
| 4,868,750 A | 9/1989 | Kucera et al. |
| 4,887,212 A | 12/1989 | Zamora et al. |
| 4,893,270 A | 1/1990 | Beck et al. |
| 4,914,586 A | 4/1990 | Swinehart et al. |
| 4,945,476 A | 7/1990 | Bodick et al. |
| 4,958,283 A | 9/1990 | Tawara et al. |
| 4,980,855 A | 12/1990 | Kojima |
| 4,982,344 A | 1/1991 | Jordan |
| 4,994,966 A | 2/1991 | Hutchins |
| 5,020,019 A | 5/1991 | Ogawa |
| 5,065,315 A | 11/1991 | Garcia |
| 5,088,052 A | 2/1992 | Spielman et al. |
| 5,128,865 A | 7/1992 | Sadler |
| 5,146,439 A | 9/1992 | Jachmann et al. |
| 5,146,552 A | 9/1992 | Cassorla et al. |
| 5,151,857 A | 9/1992 | Matsui |
| 5,157,606 A | 10/1992 | Nagashima |
| 5,204,947 A | 4/1993 | Bernstein et al. |
| 5,214,583 A | 5/1993 | Miike et al. |
| 5,218,697 A | 6/1993 | Chung |
| 5,222,160 A | 6/1993 | Sakai et al. |
| 5,226,117 A | 7/1993 | Miklos |
| 5,233,513 A | 8/1993 | Doyle |
| 5,241,671 A | 8/1993 | Reed et al. |
| 5,253,362 A | 10/1993 | Nolan et al. |
| 5,256,067 A | 10/1993 | Gildea et al. |
| 5,267,155 A | 11/1993 | Buchanan et al. |
| 5,289,376 A | 2/1994 | Yokogawa |
| 5,297,249 A | 3/1994 | Bernstein et al. |
| 5,303,151 A | 4/1994 | Neumann |
| 5,319,711 A | 6/1994 | Servi |
| 5,329,446 A | 7/1994 | Kugimiya et al. |
| 5,331,555 A | 7/1994 | Hashimoto et al. |
| 5,337,233 A | 8/1994 | Hofert et al. |
| 5,349,368 A | 9/1994 | Takeda et al. |
| 5,351,190 A | 9/1994 | Kondo |
| 5,361,202 A | 11/1994 | Doue |
| 5,367,621 A | 11/1994 | Cohen et al. |
| 5,375,200 A | 12/1994 | Dugan et al. |
| 5,377,323 A | 12/1994 | Vasudevan |
| 5,392,386 A | 2/1995 | Chalas |
| 5,404,435 A | 4/1995 | Rosenbaum |
| 5,404,506 A | 4/1995 | Fujisawa et al. |
| 5,408,655 A | 4/1995 | Oren et al. |
| 5,416,901 A | 5/1995 | Torres |
| 5,418,942 A | 5/1995 | Krawchuk et al. |
| 5,434,974 A | 7/1995 | Loucks et al. |
| 5,438,655 A | 8/1995 | Richichi et al. |
| 5,455,945 A | 10/1995 | VanderDrift |
| 5,459,860 A | 10/1995 | Brunett et al. |
| 5,491,783 A | 2/1996 | Douglas et al. |
| 5,491,784 A | 2/1996 | Douglas et al. |
| 5,500,859 A | 3/1996 | Sharma et al. |
| 5,506,984 A | 4/1996 | Miller |
| 5,515,534 A | 5/1996 | Chuah et al. |
| 5,517,409 A | 5/1996 | Ozawa et al. |
| 5,530,852 A | 6/1996 | Meske, Jr. et al. |
| 5,530,853 A | 6/1996 | Schell et al. |
| 5,537,132 A | 7/1996 | Teraoka et al. |
| 5,537,590 A | 7/1996 | Amado |
| 5,541,836 A | 7/1996 | Church et al. |
| 5,546,447 A | 8/1996 | Skarbo et al. |
| 5,546,529 A | 8/1996 | Bowers et al. |
| 5,564,046 A | 10/1996 | Nemoto et al. |
| 5,576,955 A | 11/1996 | Newbold et al. |
| 5,581,460 A | 12/1996 | Kotake et al. |
| 5,583,761 A | 12/1996 | Chou |
| 5,603,025 A | 2/1997 | Tabb et al. |
| 5,606,712 A | 2/1997 | Hidaka |
| 5,608,900 A | 3/1997 | Dockter et al. |
| 5,617,488 A | 4/1997 | Hong et al. |
| 5,629,981 A | 5/1997 | Nerlikar |
| 5,640,565 A | 6/1997 | Dickinson |
| 5,644,740 A | 7/1997 | Kiuchi |
| 5,646,416 A | 7/1997 | Van de Velde |
| 5,649,222 A | 7/1997 | Mogilevsky |
| 5,657,259 A | 8/1997 | Davis et al. |
| 5,659,676 A | 8/1997 | Redpath |
| 5,666,502 A | 9/1997 | Capps |
| 5,694,523 A | 12/1997 | Wical |
| 5,708,804 A | 1/1998 | Goodwin et al. |
| 5,708,822 A | 1/1998 | Wical |
| 5,708,825 A | 1/1998 | Sotomayor |
| 5,724,593 A | 3/1998 | Hargrave, III et al. |
| 5,724,597 A | 3/1998 | Cuthbertson et al. |
| 5,727,129 A | 3/1998 | Barrett et al. |
| 5,729,741 A | 3/1998 | Liaguno et al. |
| 5,732,229 A | 3/1998 | Dickinson |
| 5,740,252 A | 4/1998 | Minor et al. |
| 5,745,360 A | 4/1998 | Leone |
| 5,745,908 A | 4/1998 | Anderson et al. |
| 5,754,847 A | 5/1998 | Kaplan et al. |
| 5,754,857 A | 5/1998 | Gadol |
| 5,761,436 A | 6/1998 | Nielsen |
| 5,761,656 A | 6/1998 | Ben-Shachar |
| 5,761,659 A | 6/1998 | Bertoni |
| 5,761,689 A | 6/1998 | Rayson |
| 5,764,906 A | 6/1998 | Edelstein et al. |
| 5,778,363 A | 7/1998 | Light |
| 5,781,189 A | 7/1998 | Holleran et al. |
| 5,781,900 A | 7/1998 | Shoji et al. |
| 5,781,904 A | 7/1998 | Oren et al. |
| 5,787,386 A | 7/1998 | Kaplan et al. |
| 5,793,972 A | 8/1998 | Shane |
| 5,794,050 A | 8/1998 | Dahlgren et al. |
| 5,794,228 A | 8/1998 | French et al. |
| 5,794,259 A | 8/1998 | Kikinis |
| 5,799,267 A | 8/1998 | Siegel |
| 5,799,302 A | 8/1998 | Johnson et al. |
| 5,802,559 A | 9/1998 | Bailey |
| 5,805,886 A | 9/1998 | Skarbo et al. |
| 5,805,911 A | 9/1998 | Miller |
| 5,806,079 A | 9/1998 | Rivette et al. |
| 5,815,830 A | 9/1998 | Anthony |
| 5,819,092 A | 10/1998 | Ferguson et al. |
| 5,822,539 A | 10/1998 | van Hoff |
| 5,822,720 A | 10/1998 | Bookman et al. |
| 5,826,257 A | 10/1998 | Snelling, Jr. |
| 5,832,496 A | 11/1998 | Anand et al. |
| 5,835,059 A | 11/1998 | Nadel et al. |
| 5,835,089 A | 11/1998 | Skarbo et al. |
| 5,845,238 A | 12/1998 | Fredenburg |
| 5,855,007 A | 12/1998 | Jovicic et al. |
| 5,859,636 A | 1/1999 | Pandit |
| 5,860,073 A | 1/1999 | Ferrel et al. |
| 5,862,325 A | 1/1999 | Reed et al. |
| 5,864,848 A | 1/1999 | Horvitz et al. |
| 5,870,702 A | 2/1999 | Yamabana |
| 5,870,746 A | 2/1999 | Knutson et al. |
| 5,873,107 A | 2/1999 | Borovoy et al. |
| 5,875,443 A | 2/1999 | Nielsen |
| 5,875,446 A | 2/1999 | Brown et al. |
| 5,878,421 A | 3/1999 | Ferrel et al. |
| 5,884,247 A | 3/1999 | Christy |
| 5,884,302 A | 3/1999 | Ho |
| 5,884,309 A | 3/1999 | Vanechanos, Jr. |
| 5,892,919 A | 4/1999 | Nielsen |
| 5,893,093 A | 4/1999 | Wills |

| | | |
|---|---|---|
| 5,895,461 A | 4/1999 | De La Huerga et al. |
| 5,896,321 A | 4/1999 | Miller et al. |
| 5,896,533 A | 4/1999 | Ramos et al. |
| 5,897,475 A | 4/1999 | Pace et al. |
| 5,900,004 A | 5/1999 | Gipson |
| 5,905,866 A | 5/1999 | Nakabayashi et al. |
| 5,905,991 A | 5/1999 | Reynolds |
| 5,907,838 A | 5/1999 | Miyasaka et al. |
| 5,913,214 A | 6/1999 | Madnnick et al. |
| 5,920,859 A | 7/1999 | Li |
| 5,924,090 A | 7/1999 | Krellenstein |
| 5,926,808 A | 7/1999 | Evans et al. |
| 5,930,471 A | 7/1999 | Milewski et al. |
| 5,940,843 A | 8/1999 | Zucknovich et al. |
| 5,946,647 A | 8/1999 | Miller et al. |
| 5,953,718 A | 9/1999 | Wical |
| 5,963,205 A | 10/1999 | Sotomayor |
| 5,963,940 A | 10/1999 | Liddy et al. |
| 5,963,950 A | 10/1999 | Nielsen et al. |
| 5,970,505 A | 10/1999 | Ebrahim |
| 5,974,413 A | 10/1999 | Beauregard et al. |
| 5,983,171 A | 11/1999 | Yokoyama et al. |
| 5,987,403 A | 11/1999 | Sugimura |
| 5,987,460 A | 11/1999 | Niwa et al. |
| 5,987,475 A | 11/1999 | Murai |
| 5,999,938 A | 12/1999 | Bliss et al. |
| 6,006,218 A | 12/1999 | Breese et al. |
| 6,006,242 A | 12/1999 | Poole et al. |
| 6,014,677 A | 1/2000 | Hayashi et al. |
| 6,021,403 A | 2/2000 | Horvitx et al. |
| 6,022,222 A | 2/2000 | Guinan |
| 6,026,088 A | 2/2000 | Rostoker et al. |
| 6,026,398 A | 2/2000 | Brown et al. |
| 6,028,605 A | 2/2000 | Conrad et al. |
| 6,031,537 A | 2/2000 | Hugh |
| 6,038,573 A | 3/2000 | Parks |
| 6,047,252 A | 4/2000 | Kumano et al. |
| 6,055,531 A | 4/2000 | Bennett et al. |
| 6,061,675 A | 5/2000 | Wical |
| 6,067,565 A | 5/2000 | Horvitz |
| 6,076,088 A | 6/2000 | Paik et al. |
| 6,085,201 A | 7/2000 | Tso |
| 6,085,226 A | 7/2000 | Horvitz |
| 6,092,074 A | 7/2000 | Rodkin et al. |
| 6,094,649 A | 7/2000 | Bowen et al. |
| 6,108,674 A | 8/2000 | Murakami et al. |
| 6,122,647 A | 9/2000 | Horowitz et al. |
| 6,126,306 A | 10/2000 | Ando |
| 6,128,635 A | 10/2000 | Ikeno |
| 6,137,911 A | 10/2000 | Zhilyaev |
| 6,151,624 A | 11/2000 | Teare et al. |
| 6,154,738 A | 11/2000 | Call |
| 6,178,434 B1 | 1/2001 | Saitoh |
| 6,182,133 B1 | 1/2001 | Horvitz |
| 6,185,550 B1 | 2/2001 | Snow et al. |
| 6,185,576 B1 | 2/2001 | McIntosh |
| 6,223,570 B1 | 5/2001 | Horvitz et al. |
| 6,260,035 B1 | 7/2001 | Horvitz et al. |
| 6,262,730 B1 | 7/2001 | Horvitz et al. |
| 6,272,505 B1 | 8/2001 | De La Huerga |
| 6,289,342 B1 | 9/2001 | Lawrence et al. |
| 6,292,768 B1 | 9/2001 | Chan |
| 6,308,171 B1 | 10/2001 | De La Huerga |
| 6,311,177 B1 | 10/2001 | Dauerer et al. |
| 6,311,194 B1 | 10/2001 | Sheth et al. |
| 6,323,853 B1 | 11/2001 | Hedloy |
| 6,338,059 B1 | 1/2002 | Fields et al. |
| 6,373,502 B1 | 4/2002 | Nielsen |
| 6,438,545 B1 | 8/2002 | Beauregard et al. |
| 6,442,545 B1 | 8/2002 | Feldman et al. |
| 6,516,321 B1 | 2/2003 | De La Huerga |
| 6,519,603 B1 | 2/2003 | Bays et al. |
| 6,556,984 B1 | 4/2003 | Zien |
| 6,571,241 B1 | 5/2003 | Nosohara |
| 6,601,026 B2 * | 7/2003 | Appelt et al. ............ 704/9 |
| 6,618,733 B1 | 9/2003 | White et al. |
| 6,625,581 B1 | 9/2003 | Perkowski |
| 6,629,079 B1 | 9/2003 | Spiegel et al. |
| 6,651,059 B1 * | 11/2003 | Sundaresan et al. ............ 707/6 |
| 6,697,824 B1 | 2/2004 | Bowman-Amuah |
| 6,732,090 B2 | 5/2004 | Shanahan et al. |
| 6,732,361 B1 | 5/2004 | Andreoli et al. |
| 7,003,522 B1 | 2/2006 | Reynar et al. |
| 7,032,174 B2 | 4/2006 | Montero et al. |
| 7,130,861 B2 | 10/2006 | Bookman et al. |
| 7,287,218 B1 * | 10/2007 | Knotz et al. ............ 715/209 |
| 7,496,854 B2 | 2/2009 | Hedloy |
| RE40,731 E | 6/2009 | Bookman et al. |
| 2002/0035581 A1 | 3/2002 | Reynar et al. |
| 2002/0036654 A1 | 3/2002 | Evans et al. |
| 2002/0062353 A1 | 5/2002 | Konno et al. |
| 2002/0065891 A1 | 5/2002 | Malik |
| 2002/0091803 A1 | 7/2002 | Imamura et al. |
| 2002/0099730 A1 | 7/2002 | Brown et al. |
| 2002/0184247 A1 | 12/2002 | Jokela et al. |
| 2003/0004909 A1 * | 1/2003 | Chauhan et al. ............ 706/45 |
| 2003/0033290 A1 * | 2/2003 | Garner et al. ............ 707/3 |
| 2003/0154144 A1 | 8/2003 | Pokorny et al. |
| 2003/0187587 A1 | 10/2003 | Swindells et al. |
| 2003/0212527 A1 | 11/2003 | Moore et al. |

FOREIGN PATENT DOCUMENTS

| | | |
|---|---|---|
| EP | 0 725 353 | 1/1996 |
| EP | 0 840 240 | 5/1998 |
| JP | 03-174653 | 7/1991 |
| JP | 04-220768 | 8/1992 |
| JP | 04-288674 | 10/1992 |
| JP | 04-320530 | 11/1992 |
| JP | 04-320551 | 11/1992 |
| JP | 05-012096 | 1/1993 |
| JP | 05-128157 | 5/1993 |
| WO | WO95/04974 | 2/1995 |

OTHER PUBLICATIONS

Almasi, et al., Highly Parallel Computing $2^{nd}$ Edition, The Benjamin/Cummings Publishing Company, Inc.,Chapter 2, p. 38-51 and 87-95, 1994.

Anonymous, "Hypertext Method", IBM Technical Bulletin, 1 page, Oct. 1989.

Anonymous, Microsoft Corporation, Microsoft Word 97, screen printouts, pp. 1-4,1997.

Baez, et al., "Portable Translator", IBM Technical Bulletin, vol. 37, No. 11, p. 185-188, Nov. 1994.

Brookshear, Introduction to "Computer Science, An Overview", Benjamin/Cummings Publishing, p. 17, 1988.

Cohen, et al., "Method for Automatic Analysis of Meter in (both) Poetry and Prose", IBM Technical Bulletin, vol. 32, No. 9B, p. 224-226, Feb. 1990.

Dunnington, et al., "Methodology and Apparatus for Translation of Text to Sign Language Images", vol. 37, No. 04A, p. 229-230, Apr. 1994.

Eisen, et al., "Multilingual Multimedia Hyperlink Network Design", IBM Technical Bulletin, vol. 36, No. 09B, p. 471-472, Sep. 1993.

Eisen, et al., "OS/2 Presentation Manager Controls Enabled for Hypermedia Link Markers", IBM Technical Bulletin, vol. 34, No. 10B, p. 433-434, Mar. 1992.

Elliott, "Tuning up HyperCard's Database Engine", Supplement to Dr. Dobb's Journal, p. 39s-41s, Apr. 1993.

Foley, et al., Introduction to "Computer Graphics—Principles and Practice $2^{nd}$ Ed. in C", Addison-Wesley Publishing Company, Inc., p. 1-9, 1996.

Fuger et al., Proceedings of The First IEEE Conference on Evolutionary Computation, IEEE World Congress on Computational Intelligence, Walt Disney World Dolphin Hotel, Orlando, FL, vol. I, p. 229-234, Jun. 27-Jun. 29, 1994.

Germain, et al., "Hypertext Document Update", IBM Technical Bulletin, vol. 34, No. 8, p. 22-23, Jan. 1992.

Glinert, A Pumped-Up Publishing Pro, Computer Shopper, Computer Select, p. 462, Apr. 1997.

Goodman, Web Documents Without HTML, Computer Select, Computer Shopper, Apr. 1997.

Goose, et al., "Unifying Distributed Processing and Open Hypermedia through a Heterogeneous Communication Model", University of Southampton, Technical Report No. 95-6, p. 1-12, Nov. 1995.

Marshall, Acrobat, Common Ground Extend Reach Beyond Document Viewing, InfoWorld, Computer Select, Apr. 21, 1997, p. 105.

Montana, "Automated Parameter Tuning for Interpretation of Synthetic Images", Handbook of Genetic Algorithms, edited by Lawrence Davis, Chapter 19, p. 282-311, 1991.

Nelson, FrenchNow 3.0 Language-Learning Tool, Macworld Reviews, p. 83, Dec. 1995.

Takehi, "Implementing Memory Efficient Hypertext in Online Manual Tool", IBM Technical Bulletin, vol. 33, No. 11, p. 259-263, Apr. 1991.

Weibel, Publish to Paper and the Web, Computer Select, Dec. 1996, PC/Computing, p. 130.

Winston, et al., Finding Patterns in Images, LISP $3^{rd}$ Edition, Chapter 31, p. 456-483, Addison-Wesley Publishing Company, 1989.

Yankelovich, et al., "Reading and Writing the Electronic Book", Computer, vol. 18, No. 10, p. 15-30, Oct. 1985.

Addressmate Automatic Envelope Addressing Program, User's Manual (1991).

User Manual For AddressMate and AddressMate Plus by AddressMate Software (1994-1995).

Apple Internet Address Detector User's Manual, Aug. 28, 1997.

Microsoft Word 97 Help File entitled Automatically check spelling and grammar as you type (1997).

Developer's Guide to Apple Data Detectors, Dec. 1997.

Novell GroupWise User's Guide for Windows 16-BIT, Version 5.2, 1993, MS 125993, Novell, Inc., Orem, Utah. cited by other (1993).

Haak, Personal Computing—WordPerfect News: WordPerfect for Windows 7.0; A Sneak Preview, Colorado State University, vector Academic Computing & Network Services, vol. 13, No. 3, Jan./Feb. 1996.

Thistlewaite, "Automatic Construction and Management of Large Open Webs", Information Processing and Management, vol. 33, pp. 161-173 (published Mar. 1997).

* cited by examiner

| 105 | System Databases |
|---|---|
| 210 | Templates Database |
| 220 | Customer Information Database |
| 230 | Click Information Database |
| 240 | Term Database |
| 250 | EMarketing Database |

Figure 2

| 110 | Business Interfaces |
|---|---|
| 310 | Sales Force Automation Interface |
| 320 | Accounts Paid, Accounts Receivable Interface |

Figure 3

| 115 | Account Management and eCommerce |
|---|---|
| 410 | Home Page |
| 420 | View/Edit Account Information |
| 430 | System Rights Administration |
| 440 | Activity Reporting |
| 450 | ECommerce |
| 460 | Kiosk |

Figure 4

| 120 | EMarketing Management |
|---|---|
| 510 | Term Inventory Manager |
| 520 | Term Purchase |
| 530 | Customer Reporting |
| 540 | Sponsor reporting |

Figure 5

| 125 | Term Discovery Utilities |
|---|---|
| 610 | Term Finder |
| 620 | Term List Editor |
| 630 | Term List Site Matcher |

Figure 6

| 814 | 816 | 830 | | 840 | 824 | 826 | 870 | 850 |
|---|---|---|---|---|---|---|---|---|
| ← | → | Pokemon video on DVD | | Context | ← | → | ✓ | Annotation |

Figure 8A

| 814 | 816 | 830 | | 840 | 824 | 826 | 870 | 850 |
|---|---|---|---|---|---|---|---|---|
| ← | → | Pokemon video on DVD | | Context | ← | → | ✓ | Annotation |

The First of the Pokemon Video on DVD Series. Including the three TV episodes "Pokemon, I Choose You!," "Pokemon Emergency!" and "Ash Catches a Pokemon," this video is guaranteed to please anyone who's caught up in the Pokemon phenomenon.

| 814 | 816 | 830 | 860 | 840 | 824 | 826 | 870 | 850 |
|---|---|---|---|---|---|---|---|---|
| ← | → | Pokemon video | | Context | ← | → | ✓ | Annotation |

The First of the Pokemon Video on DVD Series. Including the three TV episodes "Pokemon, I Choose You!," "Pokemon Emergency!" and "Ash Catches a Pokemon," this video is guaranteed to please anyone who's caught up in the Pokemon phenomenon.

| 814 | 816 | 830 | | 840 | 824 | 826 | 870 | 850 |
|---|---|---|---|---|---|---|---|---|
| ← | → | Pokemon | | Context | ← | → | ✓ | Annotation |

The First of the Pokemon Video on DVD Series. Including the three TV episodes "Pokemon, I Choose You!," "Pokemon Emergency!" and "Ash Catches a Pokemon," this video is guaranteed to please anyone who's caught up in the Pokemon phenomenon.

| 130 | RichLink Processor System |
|---|---|
| 910 | RichLink Processor |
| 920 | Lexicon Object |
| 930 | Template Object |
| 940 | Lexicon and Template Object Manager |

| 135 | RichLink Contextual Content Server |
|---|---|
| 1010 | RichLink Template Manager |
| 1020 | RichLink Content Window Editor |
| 1030 | RichLink Content Editor |
| 1050 | RichLink Content Delivery Servlet |
| 1060 | Click Info Capture |
| 1070 | Data Synchronizers |

Figure 10

| 170 | RichLink Content Window |
|---|---|
| 1110 | RichLink Content Window |
| 1120 | Floating Toolbar |

Figure 11

| 240 | Term Database |
|---|---|
| 1210 | Licensed Dictionaries |
| 1220 | Custom Dictionaries |
| 1230 | Sponsored Dictionaries |

Figure 12

AUTOMATED CREATION AND DELIVERY OF DATABASE CONTENT

RELATED APPLICATIONS

This patent application is a Continuation of U.S. patent application Ser. No. 10/218,738, filed on Aug. 15, 2002, which claims the benefit of U.S. Provisional Patent Application No. 60/313,041, filed Aug. 16, 2001, which are hereby incorporated by reference in their entirety.

FIELD OF THE INVENTION

The invention relates generally to database building and delivery of database content. More particularly, the invention relates to an apparatus and to a family of methods that automatically builds a central database by automatically assigning links to an expert for notation and then syndicates content from that database to remote application installations.

DESCRIPTION OF THE PRIOR ART

Today a plethora of systems are available to assist electronic publishers in automating the indexing, searching and organization of their documents. Vendors such as Sopheon have applications that allow organizations to capture knowledge through structured authoring tools, terminology management, and thesauri. Software developer, Trados, identifies linguistic content and extracts sections for translation, references against the translation memory and glossaries to provide relevant information to translators, routes jobs to the appropriate translation teams and content reviewers, assigns users, deadlines, review steps, and special instructions, and provides project management and vendor management tools. Companies such as Xerox, STAR Group, DicoMaker, SDL International, Multi-Corpora, Multisystems, and ATRIL provide terminology and translation memory creation and management tools. And companies such as Semio, Sageware, Quiver, Applied Semantics, Inxight, and Interwoven provide document categorizers that analyze, categorize, and classify documents into human discernable groupings that accelerate the search process.

The patent literature shows that several inventors have worked on the process of database creation over the past decade. VanderDrift in U.S. Pat. No. 5,455,945 (1995) refers to a "system and method for dynamically displaying entering, and updating data from a database". And Wayne et al in EP0840240 refer to "a system for performing intelligent analysis and segmentation of a computer database". And others have worked on a process for aggregating user data across large data sets such as Barrett, et al. in U.S. Pat. No. 5,727,129 (1998) who refer to a "network system for profiling and actively facilitating user activities".

The problem with all current techniques and systems for analyzing and organizing documents is that none can claim the ability to automatically create consistent, high quality links and associations between concepts and pieces of knowledge in a cost effective manner. The invention is based on the premise during the process of aggregating terminology and associating knowledge that human beings will necessarily be involved. Humans may also tend to introduce errors into the process but at a much lower rate than software based automated categorizers or document processors.

The invention is hence an attempt to create a scalable system for managing the process of creating richly linked associations between terms and related content. It also specifies a commercial infrastructure that will enable the costs of production to be managed and for incentives to be generated that will enable experts to invest time and energy in the production of large-scale link databases.

SUMMARY OF THE INVENTION

A method and apparatus is disclosed which builds a database by automatically assigning terms to an expert, providing an interface and methods for the expert to enter supplemental information for that term, including definitions, explanations, specifications, links, related products or services, sponsorship information, information from content syndicators, translations, and reference works and then merging the expert-created content to a central database. Information from the database needed to create links and the rules for linking to database content are syndicated to remote servers. Tags or other identifiers are inserted within unstructured text which utilize database information in their construction or provide a means to access the database content. Connection to the database is not required at the time linking is performed.

The process begins by identifying terms of interest within a corpus of documents. Term identification may be accomplished by crawling and parsing the corpus to select terms through application of rules, such as, a term was not previously in the database, an unusually frequent use of the term, the term is an article, or the term is an unusual part of speech. Other methods of identifying terms may also be employed, including human effort, the use of search logs, taxonomy nodes, taxonomy evidence terms, meta-tags, existing glossaries or existing filters.

Once a list of terms is assembled, individual terms are assigned to experts to provide supplemental information on the term. A utility is provided to the expert that manages term assignments, allows the expert to analyze the term in context by showing expandable examples of its use in the corpus of documents, and provides the interface for entry of supplemental information as well as meta-data to help characterize the supplemental information.

Utilities are provided to the publisher that allow them to establish the rules for choosing the supplemental information which should appear for a term, for tagging the term on the page, and for designing the presentation window for that supplemental information.

A content publisher wishing to provide links from words and phrases in a document to the supplemental information contained in the database installs an automated tagging engine (the RichLink Processor) within their network. The RichLink Processor automatically downloads, from the central database, the data structures necessary to perform high-speed tagging of the text and to execute the tagging rules without requiring a connection to the database at the time of tagging, although it remains possible to do so. The RichLink Processor performs routine synchronization of its data structures with the database to insure that changes to content within the database, tagging rules, or presentation rules are reflected locally.

Several modules are included to help edit and store user preferences, track and report usage, and manage business processes.

BRIEF DESCRIPTION OF THE DRAWINGS

FIG. 2 is a diagram illustrating the databases that comprise the system databases, according to the present invention.

FIG. 3 is a diagram illustrating the modules that comprise the business interface, according to the present invention.

FIG. 4 is a diagram illustrating the modules that comprise the account management and eCommerce system, according to the present invention.

FIG. 5 is a diagram illustrating the modules that comprise the eMarketing management system, according to the present invention.

FIG. 6 is a diagram illustrating the modules that comprise the term discovery utilities system, according to the present invention.

FIGS. 8A, 8B 8C, and 8D are diagrams illustrating the Term Finder Editor List screen, according to the present invention.

FIG. 10 is a diagram illustrating the modules that comprise the RichLink Contextual Content Server, according to the present invention.

FIG. 11 is a diagram illustrating the modules that comprise the content presentation system, according to the present invention.

FIG. 12 is a diagram illustrating the modules that comprise the term database, according to the present invention.

DESCRIPTION OF THE PREFERRED EMBODIMENT

Figure 1:
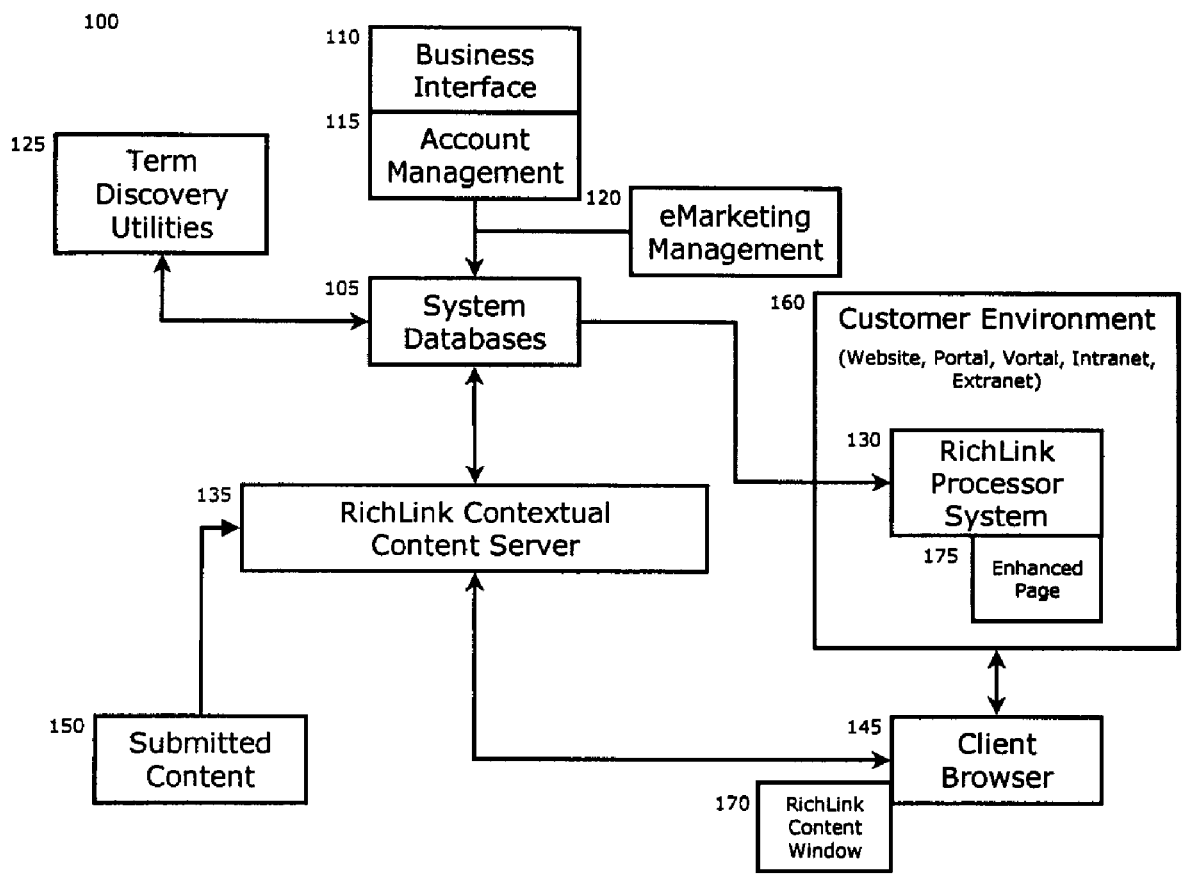
FIG. 1 is a diagram illustrating the relationship between modules that comprise the automated database creation and delivery system, according to the invention.

FIG. 1 illustrates the network of modules 100, that along with human expert analysis, performs interrelated functions that automatically create and deliver database content in the environment of online browsing and/or advertising.

The custom 1220 and sponsored 1230 dictionaries are built by automatically assigning terms to an expert, pushing content to an expert, providing expert annotation, and inserting the content into the term database. The modules that perform the interrelated functions include, system databases that store data, business interfaces that interface users with the modules, account management that manages account information, eMarketing management that enables a user to manage marketing related items, utilities that automate the process of term discovery, the RichLink Processor that tags documents, the content delivery system for presenting embedded information and an editing suite for modifying user options.

System Databases 105

FIG. 2 illustrates the databases in this core component 105 that house system data used by system processes. The databases contain templates (discussed infra), customer information, click information (discussed infra) and the term database (discussed infra).

Templates Database 210

This module 210 is the central storage location for templates. These templates are used as the foundation for customization. Templates may include combinations of databases and layers and presentation rules for the RichLink Content Window 170. This module interacts with the RichLink Contextual Content Server 135 module when creating new templates.

Customer Information Database 220

This module 220 serves as a central storage location for customer information. A portfolio for each customer is created and contains customer related information such as customer contact information, customer technical information, license information, sales tracking information, and prototype files. This module reports to the Account Management module (discussed infra), the Sales Force Automation Interface (discussed infra), and the eMarketing module (discussed infra).

Click Information Database 230

This module 230 stores data from the Click Info Capture module (discussed infra). Such information includes pages of activity, views of individual terms, views of individual layers, and click-throughs to hyperlink content items. The module reports to the Account Management and eMarketing modules (discussed infra).

RichLink Term Database 240

This module 240 is a library that contains all terms and associated content that can be sorted and queried, using business criteria to organize into dictionaries of similar information. Content types such as text, image, sound, video, mixed media, and forms may be stored in this database. There is a one-to-many relationship developed between matching terms and content associated with matching terms. Content may be identified in a number of ways to allow automated identification of the dictionary to which it belongs. Examples of identification information are the publisher name, sponsor name, site name, readership, and sponsorship dates. Content may also be associated with metadata to allow automated identification of the category to which it belongs.

Business Interface 110

FIG. 3 illustrates the modules in this core component group 110 that interfaces with operational business systems to insure smooth handling of customers from sales, services, invoicing, payment, and accounting.

Sales Force Automation (SFA) Interface 310

The SFA Interface 310 handles interaction with the customer information database and the corresponding online commercial website. Typically, a customer initiates contact online. The customer information is pulled from the database and sent to the SFA module. Customer information, prototype files, and technical information are stored in the customer database 220.

Accounts Payable (AP)/Accounts Receivable (AR) Interface 320

This interface 320 handles the exchange of information between the customer database 220 and AP and AR information. Customers are able to access invoicing and account balance information online. Click information data used in eMarketing pricing models are sent to the AP/AR interface and invoices issued and tracked. Online transactions such as subscriptions and license information are stored in the customer database and are sent to the AP/AR interface for invoicing.

Account Management and e-Commerce 115

FIG. 4 illustrates the modules in this component group 115 that allows customers, partners, and services employees to manage account information and to purchase additional products and services as their needs develop or as additional services and capabilities are offered. Customers using this module are able to update this component according to their needs.

Home Page 410

A user of the system has a home page portal which links them to parts of the system and provides access to personalized content such as news, products and service announcements and promotional items. The homepage includes features such as focused page content, based on the user's profile and preferences. The homepage also contains user information, such as user rights, events, links to account management and eCommerce modules, links to eMarketing modules, links to RichLink Contextual Content server modules, links to a support and product website, forum links and news, success stories and product announcements.

View/Edit Account Information 420

This module enables customer modification of account information, such as contact and technical information. From this module a user is able to view and edit contact information, view and edit technical information, view account balances and invoices, view and edit payment methods, view licenses, select newsletter options, and specify the contents of a user home page.

System Rights Administration 430

This module enables companies to assign role-based privileges to a user. For example, the role of marketing manager has privileges related to marketing, such as, editing the appearance of the RichLink Content Window. The role of an editor has priveleges related to content, such as editing and adding content for terms. Email can be used to notify users of their privileges and of any privilege changes. Error-checking routines are present which ensure the proper privileges are assigned.

Activity Reporting 440

This module tracks activity, system capacity, and metrics for analysis, planning, and support. Activity statistics include server, file processing and click information. Examples of file processing statistics are, files processed, dictionaries used, errors and links created. Examples of click statistics are clicks per term, number of content views, click-throughs, survey results, page analysis, ID session analysis, most viewed terms and content, and least viewed terms and content. Server statistics include time in certain phases, server logs, uptime and downtime.

Reporting capabilities can be tailored to a user's roles and privileges so different reports are available to employees, customers, and sponsors. A user can customize reports by specifying the date range for the report and modifying other query or sort criteria.

E-Commerce 450

This module sets up a generic configuration for the online sale of products and services. The module provides a reseller/partner ordering system, options to allow a 20 user to add products and services, a marketplace for the sale of term sponsorships, a quotation tool, and a licensing system for hosted service and software customers that run the service at their site.

A user can add, change and delete dictionaries and services. This module interfaces with the accounts receivable module to keep track of records, and with the term rights purchase module, to track site sponsorships. The module also handles the payment of the sales and/or services purchased, and generates sales quotes.

Kiosk 460

This module processes files that occur outside of typical hosted service environments. Examples of such occurrences are, submission of documents from the World Wide Web and from a desktop for processing, credit card transactions, one-off processing, uploading, and downloading of documents.

eMarketing Management 120

FIG. 5 illustrates the modules in this core component group 120 that enable participants to manage eMarketing efforts for both term sponsors and portal sites that have contextual eMarketing.

Term Inventory Manager 510

This module defines term sponsorship opportunities on contextual eMarketing sites. Sites can customize their term sponsorship opportunities by defining term sponsorship opportunities variables, defining pricing models, interfacing with the eMarketing database and interfacing with the Click Info module.

Term sponsorship opportunities are defined by editing domain, layer, readership and term periods associated with sponsorship of a term or cluster of terms. Pricing model variables include specifying the terms in a cluster, setting a fixed price for a cluster, having an auction for a cluster, and setting the time period for which a price is active.

This module interfaces with the eMarketing Database to edit and store sponsorship opportunities, and make them available to sponsors. The module interfaces with the Click Information Database to track impressions and interfaces with the Term Database to serve appropriate content and rotate content.

Term Rights Purchase 520

This module enables a user to search for sponsorship opportunities and buy rights to include contextual marketing material when a term is clicked on. A user searches for a term across sites to determine the availability of sponsorship opportunities. If a sponsorship opportunity is available, the user has the opportunity to purchase the sponsorship opportunity for that site.

This module can process payment for sponsorship opportunities and also handle invoicing. Different pricing systems are available, such as fixed pricing, auctions, discount pricing for multiple ads and pricing based on term length, and pricing based on a guaranteed number of impressions. The eMarketing database stores sponsorship availability notifications and any rights purchased.

Portal Reporting 530

This module generates sponsorship reports for contextual eMarketing portals.

A user can view what terms on a site are sponsored, see who the sponsor of a term is, the terms of that sponsorship, and click information statistics such as impressions and click-throughs.

Sponsor Reporting 540

This module generates sponsorship reports for contextual eMarketing sponsors. A user can view what terms they have sponsored for a particular site or across all sites, the terms of that sponsorship, and click information statistics such as impressions and click-throughs.

Term Discovery Utilities 125

FIG. 6 illustrates the modules in this core component group 125 that automate the process of discovering and collecting terminology. The terms in the list can then be made available for sponsorship or have content associated with them through the Content Manager 1120 module.

Term Finder 610

Figure 7:
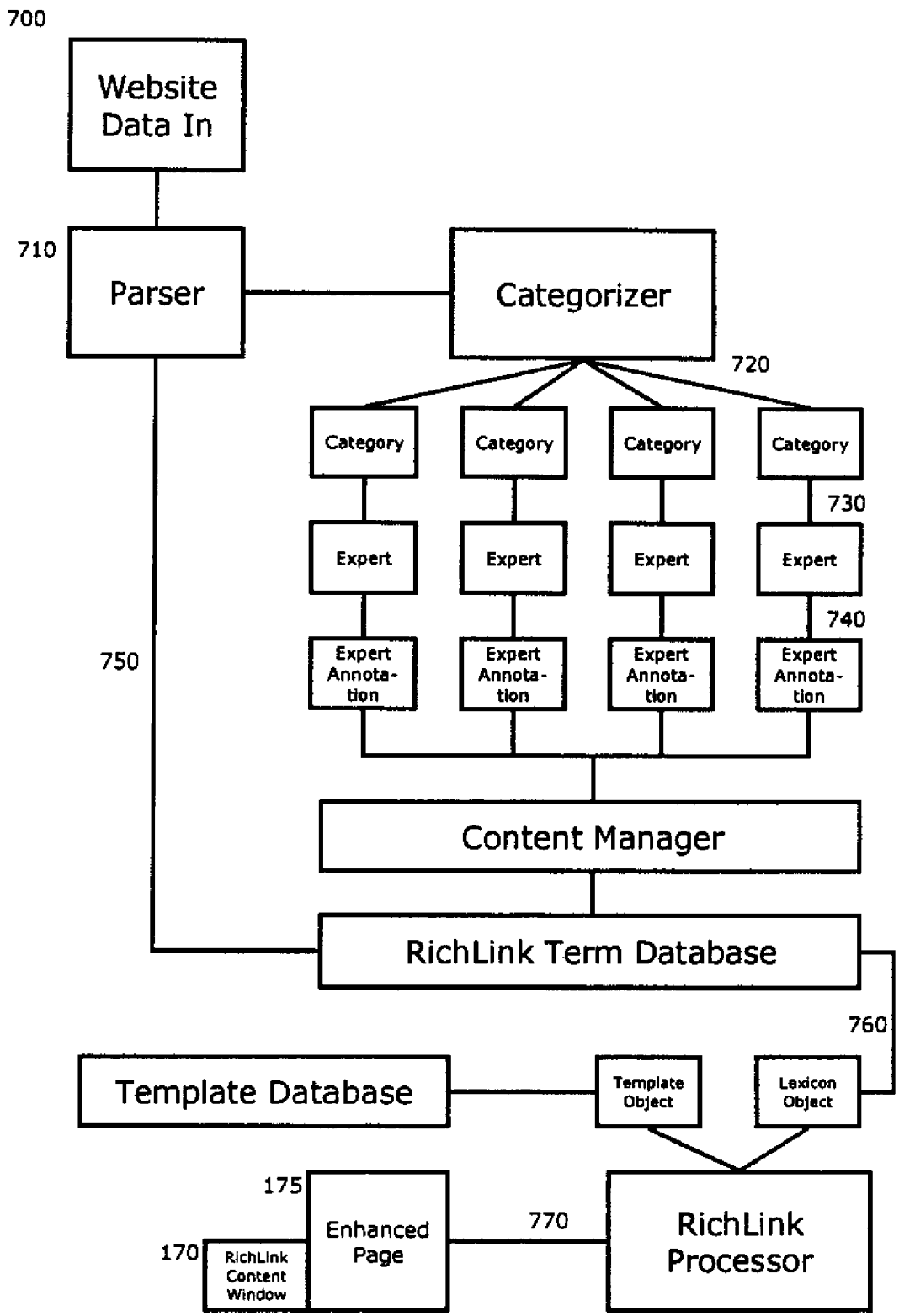
FIG. 7 is a diagram illustrating the steps performed to automatically create, syndicate, and link to database content, according to the present invention.

FIG. 7 is a flowchart that illustrates the term finder module. The term finder module performs a full text index of a corpus of documents such as a website and generates a list of terms that may be of interest 700. The term finder is directed to a top-level folder and then recursively crawls through that folder and every sub-folder searching for all files that match a specified file type or types. Files matching the specified types are parsed 710 using natural language processing to tokenize the text into significant objects such as words and phrases until a full index of all words and phrases on the site is created.

From this full index, terms of interest are chosen using a set of rules. These rules include for example, but not by way of limitation, whether or not the term currently exists in a database, whether there is an unusually high frequency of use of the term, the type of term and whether the term is used in an unusual manner. Examples of types of term rules are, product names and company names. An example of a term used in an unusual manner is a verb used as a proper noun. As terms are chosen, a list is created containing terms of interest as well as the rules that led to their selection. The pages and sites on which the terms occur are noted and categorized.

Frequency values are determined by using a normalization factor. The normalization factor is calculated by taking the term in its chain context, and dividing it by its overall appearance in all chains on the site. For example, the chain "Pokemon video on DVD" may appear once on a website, that also mentions Pokemon nineteen other times on the site. The other nineteen times discuss Pokemon trading cards and Pokemon lunch boxes. Thus the normalized frequency would be one in twenty, or 0.05. A normalized threshold such as 0.20 or higher is required by this rule to classify the website as pertaining to a term and thus select this term. Thus, in this example this website is not classified as pertaining to Pokemon videos on DVD and Pokemon videos on DVD is not selected because 0.05 is not greater than or equal to 0.20.

The selected terms are then categorized by field of pertinence 720. For example, the term Pokemon can be categorized as an animated series, toy, or game. The term is then sent to experts 730 in each field of knowledge. Each expert analyzes the term in context, determines how the term should be categorized by accepting, rejecting, or modifying the categorization choices made by the system, and enters annotation content for the term. In the example, if the term "Pokemon video on DVD" is sent to an expert, then this term is categorized 740 in the animated series section and appropriate annotations added. If the term refers to Pokemon trading cards, then that term is categorized and annotated in the game section. If a term is familiar and/or known it bypasses the experts and goes straight to the Term Database 750 and is associated with existing annotational content as well as being made available for additional expert annotation.

Terms from the database are tagged in source documents 760 using the RichLink Processor or other automated methods such as those disclosed in U.S. Pat. No. 5,822,720, System and method for linking streams of multimedia data for reference material for display, Oct. 13, 1998, Bookman et al. The tag can serve functions such as linking to a RichLink Content Window containing additional information or marking the term for an application performing further processing of the page. The final result 770 is a tagged and annotated enhanced document 175.

The RichLink Content Window 170, which displays information related to the term, is available by clicking on a tagged term. The information contained in a RichLink Content Window comes from a multitude of sources including annotations added by experts 740, related products or services, sponsorship information, information from content syndicators, translations and reference works.

Term List Editor 620

This module aids an expert to review and edit the list created by the term finder module. Examples of editing features are view list, view term in context, expand terms, truncate terms, add terms, delete terms, sort list, and save list. FIGS. 8A-8D illustrate the term finder list editor screen. A user can click on a Context tab 840 to view the term in the context of the original page inside a Context window 880, where the occurrence of the term is highlighted as shown in FIG. 8B. The user can drag the highlighted area 860 to change what portion of the term is selected as shown in 8C. Tabs are located to the left 814, 816 and right 824, 826 of the term or phrase 830. A user clicks on the tabs to extend 814, 826 or reduce 816, 824 portions of the phrase that surround the term. For example, in FIG. 8D, the user has clicked on the left reduce tab 814, so the selection reduces one word. These extend and reduce tabs work whether the Context window is open or not. Once the desired term is selected, the Commit tab 870 can be selected to make the changes in the Term database. An Annotations tab 850 is also present. The Annotations tab 850 displays known annotations for the word when selected.

This module interfaces with the Terms Database to create new terms if the term did not previously exist, with the Term Inventory Manager to create sponsorship opportunity definitions for words that have not already been sponsored, and with the Content Builder to request content for a term.

This module also provides list management support for modules that use lists of terminology, such as the Term Rights Purchase module and the Content Manager module. Lists of terminology created in this module can be loaded within other modules to filter to a desired list of terms. User tools include, create list, load list, save list, save list as, and delete list of terms. A saved list may be assigned to a specific module or made available to other users. A comparator function can be used to analyze two or more lists to merge the lists, delete duplicates, or find duplicates.

Term List Site Matcher 630

This module will accept a list of terms and a top-level folder in a corpus of documents such as a website as inputs. It will recursively crawl through the top-level folder and every sub-folder searching for all files that match a specified file type or types. An index is generated showing occurrences of terms in the list on pages in the site. Statistics such as occurrences, frequency and whether the term is already linked or sponsored are noted.

Richlink Processor System 130

The modules in this core component group 130 enable the process where in-context information is automatically linked to documents.

RichLink Processor 910

This module takes normal source pages and automatically enhances them through links to content from a variety of sources, such as authoritative reference works and dictionaries, dictionaries of syndicated content, customer-created dictionaries, and dictionaries of sponsored terminology allowing third parties to attach advertising content to occurrences of terms on sites or through tags which identify and provide information about the terms they surround. The result is an enhanced page 175 that contains links to the additional content. Processing may occur in real-time between page request and page display in a web server environment or it may occur offline as a pre-processing step to publishing documents. The process can be performed on common file types such as XML, HTML, RTF, Word documents, and Adobe Acrobat PDF files.

The RichLink Processor interacts with the Template Object 930 to identify the rules that should be used in processing and the Lexicon Object 920 to identify what terms should be tagged in the source text. Tags in the page identify whether a page should be processed by the RichLink Processor or not, denote sections of a page to be processed, and indicate the template that should be used in processing that page/section.

Tags may be inserted to identify page-level metadata criteria that should be used to limit the result set when tagging the page. For example, a tag may be inserted into the page identifying the page as belonging to the category "Video Games". This tag can then be used to limit matches to terms or annotations that have also been identified as belonging to the category "Video Games". Page-level metadata tags may be inserted ahead of time or when the page is dynamically constructed.

When a file is sent to the RichLink Processor, several operations can be optionally run on the text. The text may be parsed, the document categorized, and page-level meta data tags added to the page. The document content may be summarized. Matches between terms on the page and terms occurring in the Lexicon Object for dictionaries specified by the template used with this page are identified. A tag is created around matched terms if meta data or other criteria are met. Typically this tag is a hyperlink that leads to additional annotational content, however additional tag structures can be used. Finally, the document may be inserted into the Term Database as annotational content for identified category keywords.

A user interface is provided which allows administrative access to process and queue controls, view, search and sort log data, and process statistics.

Lexicon Object 920

The Lexicon Object provides a local representation of the content of the Term Database for use by the RichLink Processor 910 so a direct connection to the Term Database is not required and the Term Database may be on a remote server from the RichLink Processor. The Lexicon Object contains data required to match terms and create tags such as a representation of the terms in the database optimized for fast matching by the RichLink Processor, the TermID from the Term Database, the DictionaryID from the Term Database, and other Term Database content for which fast access is required, such as annotation content.

The Lexicon Object may be stored once on a single server and accessed by all active RichLink Processor instances running on that server. Or it may be stored once on a central server and accessed by active RichLink Processor instances on multiple servers. It can contain lexicons for multiple dictionaries in a single object instance.

Template Object 930

The Template Object provides a local representation of the Template that contains the rules for processing and linking a file so a direct connection to the Template Database is not required and the Template Database may be on a remote server from the RichLink Processor. The Template Object contains the rules required by the RichLink Processor such as dictionaries used for linking or as filters (stop word lists), meta data criteria that must be met when making a match, the format of the tag to be inserted before and after a matched term including macros to be expanded by the RichLink Processor with data specific to the matched term, run-time processing options such as limiting the number of matches found or turning stemming on and off, and any code required to be placed into the page to enable operation of the RichLink Content Window or other applications The Template Object may be stored once on a single server and accessed by all active RichLink Processor instances running on that server. Or it may be stored once on a central server and accessed by active RichLink Processor instances on multiple servers. It can contain multiple templates in a single object instance.

Lexicon and Template Manager 940

Figures 9A, 9B:
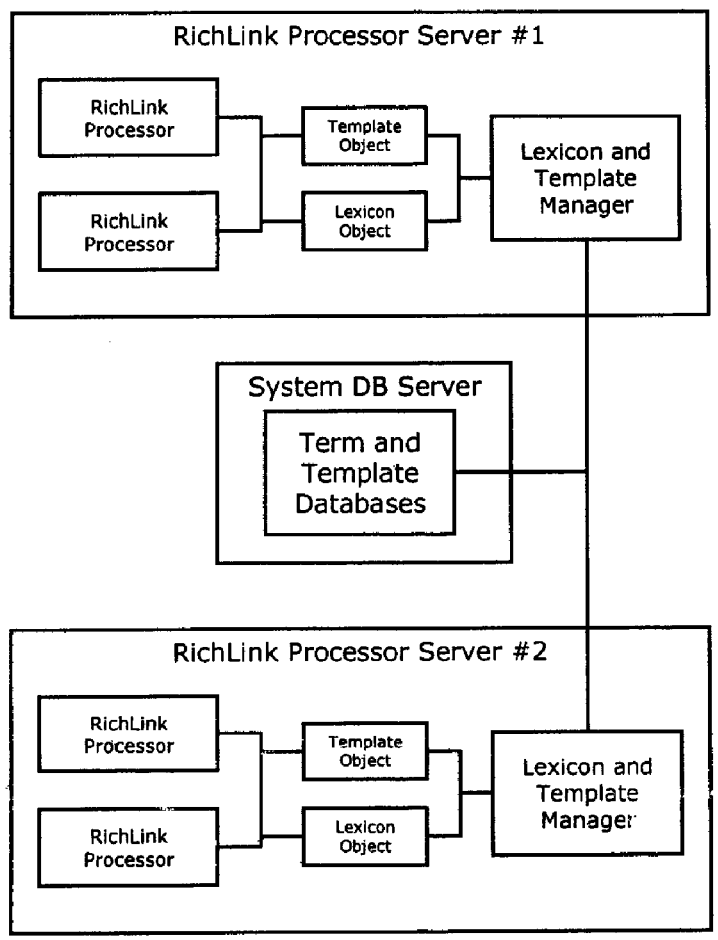
FIGS. 9A and 9B are diagrams illustrating the modules that comprise the RichLink Processor system and the operation of that system, according to the present invention.

The Lexicon and Template Manager insures that the Lexicon Object 920 and Template Object 930 are synchronized with the Term and Template Databases. When the server is started, the manager is automatically launched. It accesses the Term Database to obtain the latest version of the Lexicon Object for that server and accesses the Template Database to obtain the latest version of the Template Object for that server, as shown in FIG. 9B. The Lexicon Object and Template Object are then stored in the server's memory where they can be accessed by any active RichLink Processor instances running on that server.

The Lexicon and Template Manager must log into the databases. Preferences are enforced based on that login so the server only obtains lexicons and templates for which they have privileges.

The Lexicon and Template Manager may also be triggered via remote request, such as an HTTP request, so manual refreshes of the Lexicon Object and Template Object can occur while the server is running. The Lexicon and Template Manager also includes a timer function to trigger scheduled refreshes of the Lexicon Object and Template Object.

RichLink Contextual Content Server 135

FIG. 11 illustrates the modules in this core component group 135 that enable end users such as customers, partners, or hosted service team members to create, manage, and modify templates, dictionaries, and content windows.

RichLink Template Manager 1010

This module provides an environment for creating templates that define the rules by which source files are processed, as well as how templates are managed for each customer. The template defines parameters such as dictionaries and filters, meta data criteria, look and feel of the content window, and source page tag structure.

A user has many options to modify a template including adding, changing or deleting entire templates.

Layout settings include background colors and images for the regions of the content window, custom content to be added before or after system generated information, logo or advertising image files and the location they link to, icons for help, print, or feedback options, and the location they link to.

Layer settings include adding, deleting or modifying layers, setting the order of appearance for layers, styles for text in the layer, and specifying the elements which appear in either the content or navigation area for a layer. Elements that can be used include system generated information like Term, Layer Name, Annotation Title, RichLink Dictionary Content, and Citation. Other elements include user decorative elements like blocks of custom-entered text, images (with or without links), line breaks, and horizontal rules.

RichLink Dictionary Content settings include the dictionaries to be used for linking in that layer. Settings for each dictionary may be further customized such as whether the dictionary should be used as a filter or not, whether page-level metadata criteria will be used with this dictionary by the RichLink Processor 910, any standard metadata criteria to be used in matching, the Citation string to be used for this dictionary, or a custom query to be used to fetch content for this dictionary. Unless a custom query is specified, a generic query is generated based on RichLink Dictionary Content settings.

RichLink Dictionary Content settings may also include rules-based content generation. An example of a rule would be to use a mix of content types like no more than 60% text, 20% images, 10% audio, and 10% video. Another example of a rule would be to rotate content which matches a given criteria so a different piece of content shows up on subsequent viewings. Another example of a rule would be to only show content during a specified date range or only for a specified number of impressions, as in the case of a marketing campaign.

An option is given to a user so that he may preview an annotation or other linked content.

RichLink Content Window Editor 1120

This module enables the manual creation of term-specific content windows, which will be added to a processed file in addition to content windows generated by page-level rules specified in the template. This way, a product name such as "Microsoft Word" could have a content window with a different set of links than "Pokemon" inserted during the same processing run.

The user interface controls for the Content Window Editor would be mostly the same as the Template Manager. Inside of the Content Window Editor a user may also make requests to see content available for the term in dictionaries they have privileges for, search other dictionaries for available content and purchase content, and to send a term to the Content Manager module for expert annotation.

RichLink Content Editor 1130

This module 1130 is a workflow and editing application that enables editing of content within the Term Database, administration of dictionaries, and management of a virtual team of content submitters 150 to build dictionary content. The service host would use this module to gather a group of experts together and expedite content submission when building dictionaries. A list of terms is created using the Term List Editor 620 that define the content to be created. Individual terms from the list can be assigned manually or automatically to an expert based on the expert's area of knowledge. The expert submits content for the terms assigned to them.

For example, content sponsors can use this module to assign lists of terms they are sponsoring to the advertising agencies or internal creative services teams responsible for submitting sponsored content for those terms. A marketing team building a dictionary of product information can assign product names to the managers associated with those products or product lines. Research services building a dictionary of company information can assign company names to the analysts responsible for tracking that company or that market space.

The group or individual assigned terms in this way will have an editing interface that enables them to submit content for their list of terms. The types of content that may be submitted include text, links, images, movies, sound files, response forms, or mixtures of some or all of these. Meta data may be specified for the term and content to categorize it. Searches may be performed to find terms and content or to locate additional resources for a term. For example, an expert could search dictionaries for which they do not have privileges for suitable content and then purchase content to be used with their term.

Workflow rules drive content through submission, review, revision, and acceptance cycles, by notifying, assisting, and providing an interface for responsible parties to take action on submissions. For example, an expert can view a list of terms for which they need to submit new content, view a list of terms and content which was returned for revision along with comments on the desired revisions, and submit new or revised content. A content sponsor can view a list of terms and content that has recently been submitted, review it, and then either accept it, reject it, or return it for revisions with comments.

This module also enables editing access to the Term Database and dictionaries for administrators, content team members, partners, and customers. Individual terms and content can be added, modified, or deleted. Dictionary administration actions may be performed such as adding, changing, or deleting dictionaries, specifying dictionary settings, managing the meta data group and value lists used by RichLink Processor as match criteria, maintenance procedures to clean up tables and indexes, mapping fields from an external database to the Term Database in order to merge data from one to the other or to provide pointers to data from one to the other, and scheduling regular merges of data for synchronization.

This module allows users to preview content by displaying text directly within the editor, clicking links to view the page a link leads to, providing thumbnails of images and movies as well as links to the full image or movie, linking to sound files, and displaying file sizes.

RichLink Content Delivery Servlet 1050

This module retrieves and displays content by constructing and serving the RichLink Content Window 170. A request is made to the RichLink Contextual Content Server which contains information such as the ID of the term clicked on, the ID of the template used in processing the page, page-level metadata settings, and the customer ID. This module interacts with the Term Database and the Template Manager to select and display the appropriate content, navigation elements, and display elements in the RichLink Content Window.

The RichLink Content Window may be returned in multiple formats such as HTML pages, an XML document which can be transformed as desired before sending it to the browser or to an application, an embedded pop-up window, or using technologies such as Flash to build a display environment.

Click Info Capture 1060

This module tracks a user's click information by tracking each session within the RichLink Content Delivery Servlet. An anonymous session ID is assigned and information such as the page a click originated from, terms clicked on, layers clicked on, content viewed, start and end times for a session, template IDs, customer IDs, response times, and click throughs are noted.

This module is integrated with the eMarketing module 120 and the Term Database 240 to track, report on, and manage sponsorship opportunities which are based on or expire after a certain number of end-user impressions. It is also integrated with the Click Information Database 230 to store click data and the Activity Reporting module 440 to report on end-user activity.

Data Synchronizers 1070

This module provides synchronization between customer databases containing terms and content and the Term Database. When customers already maintain relevant databases, this module will map fields from the customers database to fields in the Term Database and migrate data between the two systems. Synchronization of data can be scheduled so transfers between the two databases occur automatically when a change is made in the customer's database or at a scheduled time each day, week, or month.

Tools are provided that assist in creating maps of the fields between databases and synchronization for most commercially-used database formats, such as Oracle, MS SQL, Informix, Sybase, and IBM DB2.

RichLink Content Window 170

The modules in this core component group enable interaction with annotation content in on-line documents. It includes viewing information within a content window after clicking on a word or phrase, viewing, searching and sorting data in the contnent window, setting user preferences, and alternate viewing environments, such as a floating toolbar.

RichLink Content Window 1110

When a user clicks on a word or phrase, content is displayed in a RichLink Content Window that is typically placed in a pop-up window but which can also be embedded into a page. The RichLink Content Window may be formatted for single or multi pane display of content. Menu options listing available content are presented in a Navigation Pane while content associated with the term and menu item chosen appears in a Content Pane.

Content comes from the dictionaries stored in the Term Database. The content comes from types such as text, images, movies, sounds, forms (including eCommerce transactions, surveys, or polls), or a mixture of the above. Content may be saved on the client side so that it may viewed off-line, searched, printed, or sent to someone.

Links are present within both panes of the Knowledge Burst, and a user may navigate the links as with a mini-browser. Some links may be proprietary, requiring a password, payment of fees or both. Ads, logos, text links or other branding and informational elements may appear in the pop-up menus or in the decorative frames surrounding the content and navigation panes and may be served from the RichLink Content Delivery Servlet, the customer's own site, or third-parties such as ad serving companies.

A content window initially appears at the location of the term clicked on, but a user may move the content window to any area of the display.

Multiple touch points exist where a user can view a content window, such as a PDA, cell phone or computer.

Floating Toolbar 1120

This is an alternative content window menu that offers advanced features, such as, search, sort, credits, about and help on the entire group of RichLink content available on a page. The floating toolbar is similar to the RichLink Content Window in that the same capabilities are available. Additionally, all variations of the content can be viewed. A user also has the option to set persistent user options such as linking highlights, collapsible or exploded menus, and which layers are displayed. A user may use the default search and filtering criteria, or may set and save his own. The toolbar also generates content lists that contain suggestions for further research. For example, "users who liked this RichLink content also liked the following information."

Term Database 240

The modules in the Term Database represent the types of dictionaries of information that may be managed by the system.

Licensed Dictionaries 1210

Licensed dictionaries include licensed and/or approved third party information, such as translation dictionaries, reference works, and dictionaries of unbiased and high quality information. The content in these dictionaries is licensed to sites to enhance content for global audiences and/or to enhance a user's depth of knowledge.

Examples of translation dictionaries are Kenkyusha Readers or other foreign language dictionaries. Examples of reference works are the American Heritage or Physician's Desk Reference. Examples of unbiased, high quality information sources are Facts and Comparisons which provides drug information, Dun & Bradstreet which provides financial information, and Intelligent Medical Objects which provides links to medical journals, publications, and sites.

Custom Dictionaries 1220

Custom dictionaries include any kind of dictionary that is created by a customer for use on authorized sites. This commonly occurs on internal sites where the terms are proprietary information, and are not made available to the general public. Typical terms in a custom dictionary include company-specific terminology with definitions and translations or product names with product information and news.

Sponsored Dictionaries 1230

Sponsored Dictionaries contain content provided by third parties for use wherever a term that they have purchased appears during a certain period of time or for a number of impressions. Most often this involves companies purchasing rights to provide sponsored content from a site. Sponsored content can take almost any form, such as text, images, mixed media, banner ads, surveys, links, and email requests.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for processing database content, the method comprising the steps of:
   syndicating one or more data objects associated with a term database to one or more remote computers, wherein the one or more data objects contain data associated with one or more terms;
   parsing one or more documents to identify at least one term based on at least one rule;
   identifying content for the at least one term; and
   associating the at least one term with the identified content;
   wherein the one or more data objects associated with the term database provide a representation of at least a portion of the term database at the one or more remote computers and are used to link the identified content with the at least one term.

2. The method of claim 1, wherein the content is provided by a source.

3. The method of claim 2, wherein the source comprises at least one expert who provides the content for the at least one term through an interface.

4. The method of claim 1, further comprising the step of:
   providing a sponsorship opportunity to at least one entity to sponsor the at least one term, wherein a content window is associated with the at least one term.

5. The method of claim 1, wherein the content comprises one or more of definitions, related products, related services, sponsorship information, translation, and reference works.

6. The method of claim 1, wherein the one or more remote computers access data associated with the term database for linking to the supplemental content, without a connection to the term database.

7. The method of claim 1, wherein the one or more data objects comprise a template object for identifying at least one rule for processing a source page.

8. The method of claim 1, wherein the one or more data objects comprise a lexicon object for identifying at least one term for tagging in a source page.

9. The method of claim 1, wherein the one or more data objects are synchronized with at least the term database.

10. A computer program of instructions configured to be readable by at least one programmed computer processor to execute a computer process for performing the method as recited in claim 1.

11. A computer implemented system for processing database content, the system comprising:
    a term module for parsing one or more documents to identify at least one term based on at least one rule;
    a processing module for identifying content for the at least one term; and
    a term database for storing the identified content in association with the at least one term;
    wherein one or more data objects associated with the term database are syndicated to one or more remote computers for providing a representation of at least a portion of the term database at the one or more remote computers and for linking the identified content with the at least one term, wherein the one or more data objects contain data associated with one or more terms.

12. The system of claim 11, wherein the content is provided by a source.

13. The system of claim 12, wherein the source comprises at least one expert who provides the content for the at least one term through an interface.

14. The system of claim 11, wherein a sponsorship opportunity is provided to at least one entity to sponsor the at least one term, wherein a content window is associated with the at least one term.

15. The system of claim 11, wherein the content comprises one or more of definitions, related products, related services, sponsorship information, translation, and reference works.

16. The system of claim 11, wherein the one or more remote computers access data associated with the term database for linking to the supplemental content, without a connection to the term database.

17. The system of claim 11, wherein the one or more data objects comprise a template object for identifying at least one rule for processing a source page.

18. The system of claim 11, wherein the one or more data objects comprise a lexicon object for identifying at least one term for tagging in a source page.

19. The system of claim 11, wherein the one or more data objects are synchronized with at least the term database.

20. A computer implemented system for processing database content, the system comprising:
means for parsing one or more documents to identify at least one term based on at least one rule;
means for identifying content for the at least one term; and
means for associating the at least one term with the identified content;
wherein one or more data objects associated with the term database are syndicated to one or more remote computers for providing a representation of at least a portion of the term database at the one or more remote computers and for linking the identified content with the at least one term.

21. A computer implemented method for processing database content, the method comprising the steps of:
syndicating one or more data objects associated with a database to one or more remote computers;
parsing one or more source documents to identify at least one term based on one or more predetermined rules;
identifying content for the at least one term;
linking the content with the at least one term; and
automatically associating the at least one term in the one or more source documents with at least one link;
wherein the at least one link denotes an association between the at least one term and the linked content;
wherein the one or more data objects associated with the database provide a representation of at least a portion of the database at the one or more remote computers; and
wherein the linked content is displayed on a user interface based upon a user interaction with at least a portion of the one or more source documents.

22. The method of claim 21, wherein the supplemental content is transmitted from a remote computer.

23. The method of claim 21, wherein the supplemental content is displayed in a content window.

24. The method of claim 23, wherein the content window is embedded in the source document.

25. The method of claim 23, wherein the content window is separate from the source document.

26. The method of claim 21, wherein the user interaction comprises a user selecting the at least one term with a mouse cursor.

27. The method of claim 21, wherein the user interaction comprises a user clicking the at least one term with a mouse cursor.

28. The method of claim 21, wherein the at least one term is visibly enhanced to notify the user of available supplemental content.

29. The method of claim 21, wherein the supplemental content comprises at least one advertisement.

30. The method of claim 21, wherein one or more of the predetermined rules are based on frequency of a term within a source document.

31. The method of claim 21, wherein one or more of the predetermined rules are based on manner of linguistic usage of a term.

32. The method of claim 21, wherein one or more of the predetermined rules are based on presence or lack thereof of an entry in a database.

33. The method of claim 21, wherein one or more of the predetermined rules are based on availability of supplemental content for a term.

34. The method of claim 21, wherein one or more of the predetermined rules are based on quality or amount of available supplemental content for a term.

35. The method of claim 21, wherein one or more of the predetermined rules are based on one or more financial incentives.

36. A computer implemented system for processing database content, the system comprising:
a term module for parsing one or more source documents to identify at least one term based on one or more predetermined rules; and
a processing module for identifying content for the at least one term, linking the content with the at least one term, and automatically associating the at least one term in the one or more source documents with at least one link;
wherein the at least one link denotes an association between the at least one term and the linked content;
wherein one or more data objects associated with a database are syndicated to one or more remote computers for providing a representation of at least a portion of the database at the one or more remote computers; and
wherein the linked content is displayed on a user interface based upon a user interaction with at least a portion of the one or more source documents.

37. The method of claim 1, wherein the identified content is displayed on a user interface in response to a selection of the at least one term by a user.

38. The method of claim 1, wherein the identified content is stored in the term database.

39. The method of claim 2, wherein the source comprises one or more of a dictionary, customer created data, advertising content and reference work.

40. The method of claim 1, wherein the content comprises one or more of text, image, sound, video and mixed media.

41. The system of claim 11, wherein the identified content is displayed on a user interface in response to a selection of the at least one term by a user.

42. The system of claim 11, wherein the identified content is stored in the term database.

43. The system of claim 12, wherein the source comprises one or more of a dictionary, customer created data, advertising content and reference work.

44. The system of claim 11, wherein the content comprises one or more of text, image, sound, video and mixed media.

45. The system of claim 20, wherein the identified content is displayed on a user interface in response to a selection of the at least one term by a user.

46. The system of claim 20, wherein the identified content is stored in the term database.

* * * * *